United States Patent
Agrawal et al.

[19]

[11] Patent Number: 5,950,134
[45] Date of Patent: Sep. 7, 1999

[54] METHOD AND APPARATUS FOR SPATIAL REDUNDANCY IN CELLULAR NETWORKS

[75] Inventors: Dharma P. Agrawal, Raleigh, N.C.; Prathima Agrawal, New Providence, N.J.

[73] Assignee: AT&T Corp., New York, N.Y.

[21] Appl. No.: 08/925,446

[22] Filed: Sep. 8, 1997

[51] Int. Cl.$^6$ .................................................. H04Q 7/38
[52] U.S. Cl. .................. 455/439; 455/440; 455/441; 455/436
[58] Field of Search ................................ 455/445, 422, 455/453, 436, 440, 441, 421, 437, 439

[56] References Cited

U.S. PATENT DOCUMENTS

| | | | |
|---|---|---|---|
| 5,293,643 | 3/1994 | Israelsson | 455/33.2 |
| 5,379,448 | 1/1995 | Ames et al. | 455/33.4 |
| 5,432,842 | 7/1995 | Kinoshita et al. | 379/60 |
| 5,794,149 | 8/1998 | Hoo | 455/436 |
| 5,809,414 | 9/1998 | Coverdale et al. | 455/421 |
| 5,878,349 | 3/1999 | Dufour et al. | 455/439 |

OTHER PUBLICATIONS

"Minimizing Cellular Handover Failures Without Channel Utilization Loss", Authors: B. Narendan, P. Agrawal, D.K. Anevkar, Proceedings of IEEE Globecom, Mov. 1994, 7 pages.

"Channel Management Policies for Handovers in Cellular Networks", Authors: P. Agrawal, D. Anvekar, B. Narendan, Bell Labs Technical Journal, Autumn 1966, pp. 97–110.

"Microcellular Communication Systems with Hierarchial Macrocell Overlays: Traffic Performance Models and Analysis", Authors: S.S. Rappaport, L.R. Hu, Proceedings of the IEEE, vol. 82, No. 9, Sep. 1994, pp. 1383–1397.

"Teletraffic Performance of Highway Microcells with Overlay Macrocell", Authors: S.A. El–Dolil, W–C Wong, R. Steele, IEEE Journal on Selected Areas in Communications, vo. 7, No. 1, Jan. 1989, pp. 71–78.

*Primary Examiner*—Dwayne D. Bost
*Assistant Examiner*—Erika A. Gary

[57] ABSTRACT

A cellular network includes a mobile switching center and a network of cells through which one or more mobile stations can move. Each of the cells is managed by a base station, while a plurality of base stations are controlled by a control processor within the mobile switching center. Spare stations are introduced at strategic locations in the cellular network. As mobile stations move through the network of cells communicating with various base stations and spare stations the mobile switching center receives reports from spare stations relating to the status of various parameters characterizing conditions within the network of cells. The mobile switching center determines the position and velocity of mobile stations moving through the network of cells based on incoming reports. The assignment of a call associated with a mobile station can be changed from a base station to a spare station, and can then be changed from the spare station to another base station if the base station fails or becomes overloaded.

7 Claims, 6 Drawing Sheets

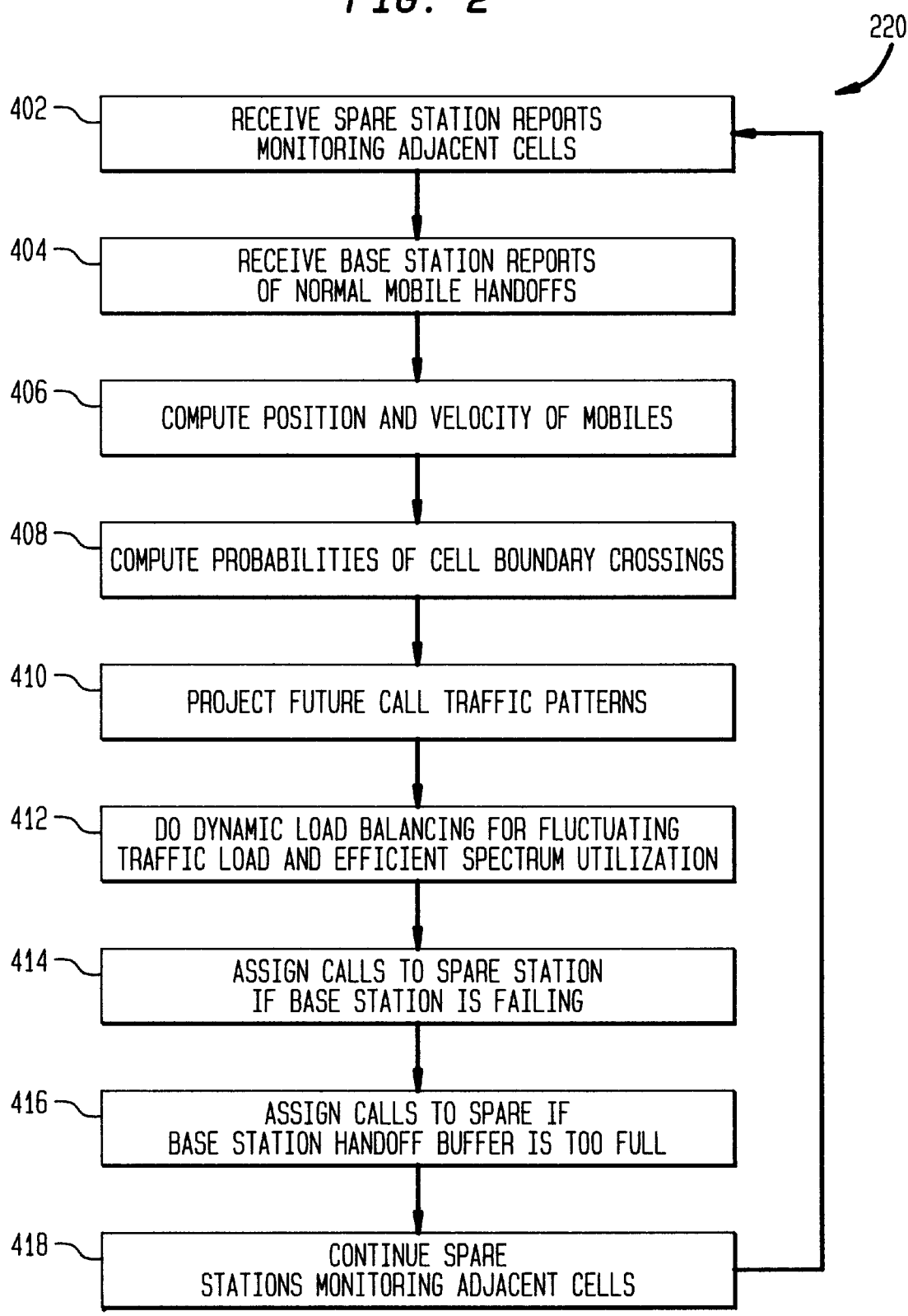

METHOD AND APPARATUS FOR SPATIAL REDUNDANCY IN CELLULAR NETWORKS

FIELD OF THE INVENTION

This invention relates to improving the performance and reliability of a cellular network by selectively introducing spatial redundancy therein.

BACKGROUND OF THE INVENTION

Mobile cellular networking has become increasingly commercially important because it offers enhanced performance and flexibility for many kinds of information transfer, including multimedia traffic. A mobile cellular network provides such services for a geographical area, which is divided into cells that each encompass particular geographical sections of the service area. A base station is deployed in and associated with each cell of the mobile cellular network. The base stations of various cells are connected by a wireline network and are controlled by a mobile switching center using the wireline network. The mobile switching center includes a control processor(s) which provides the necessary computing and communication processing required to manage the network of base stations deployed throughout the service area.

Each base station services all the mobile stations within the cell surrounding the base station with desirable radio frequency (RF) signal strength. As used herein, "mobile station" is defined to include portable cellular telephones, automobile telephones, laptop and palmtop computers, personal digital assistant (PDA) equipment with wireless modems, TDMA and CDMA transceivers, pagers, and other, perhaps larger, voice and data communicating devices. The base station in each cell has a certain fixed number of radio communication channels which it can assign to calls in progress within that cell. A mobile station ordinarily communicates with the base station in the cell in which it is located over one of these radio communication channels.

The individual cells tile the entire geographical service area, but the tiling is not exact and neighboring cells overlap to form handoff regions. According to conventional practice, when a mobile station crosses the boundary of the current cell and moves into another cell while transmitting information, a communication path must be established with a new base station located in the new cell. If radio communication channels are not available in the new cell and the mobile station is not able to acquire a new channel in the new cell and relinquish its channel in its old cell before it has crossed over the boundary and moved completely into the new cell, a handoff failure has occurred and the call in progress is aborted. The probability of handoff failure, that is, the probability that a mobile call in progress will be forcibly aborted during a handoff because it could not be allocated a radio communication channel in the new cell, is a major criterion for evaluating the quality of a cellular network system. Accordingly, minimizing the probability of handoff failure is desirable in any cellular network system.

In order to minimize the probability of handoff failures, an effective mobile cellular network ought to continuously decide how best to allocate the limited set of available radio communication channels in a cell to (i) new calls originating within the cell, and (ii) handoffs that migrate into the cell from neighboring cells. This task is impeded by the inability of the base station located in a cell to handle all the new calls originating within the cell as well as the handoffs that migrate into the cell from neighboring cells. The state of mobile cellular networking could be advanced and the probability of handoff failures and transmission errors could be substantially minimized if better warnings that a mobile station will soon enter a new cell were issued to the base station located in and associated with the new cell, and if there were a better way to handle failure of a base station or overloading of a base station with excessive communication with mobile stations.

SUMMARY OF THE INVENTION

By employing spatial redundancy in a mobile cellular network in accordance with the principles of the invention, handoff failure as well as transmission errors are substantially minimized. The invention provides minimal redundant spare stations which are introduced at strategic locations in the cellular network topology. The redundantly deployed spare stations (a) assist in handoffs, (b) handle new calls when a base station is overloaded, (c) participate in retransmission of data lost due to degraded channel conditions and congestion in the network, and (d) handle new calls and handoffs when a base station fails to operate.

In an illustrative embodiment of the invention, a cellular network includes a network of cells, through which one or more mobile stations can move, and a mobile switching center connected to the network of cells through a communication line. The mobile switching center controls operation of the cellular network and provides a communication path between the network of cells and the public switched telephone network. A base station located in, and associated with, each of the network of cells communicates with the mobile switching center and with mobile stations located in the associated cell over a number of radio communication channels.

According to the specific illustrative embodiment, a spare station which is able to monitor its own cell and adjacent cells and communicate with one or more mobile stations moving around the network of cells is deployed in each of the network of cells. Alternatively, more than one spare station can be deployed in each of the network of cells, or a spare station can be deployed in a region defined by a plurality of cells. In operation according to the specific illustrative embodiment, one or more mobile stations are moving through the network of cells, and a call associated with a particular mobile station has been assigned to a first base station in a first cell. Spare stations deployed in the network of cells generate reports, and the mobile switching center determines the position and velocity of the mobile station moving through the network of cells based on the reports. When it is determined that the mobile station is about to cross the boundary between the first cell and a second cell, the assignment of the call is changed from the first base station to a spare station, and then when the mobile station has moved completely into the new cell the assignment of the call is changed from the spare station to a second base station located in the second cell. Alternatively, one or more spare stations issue warnings of the impending handoff to the second base station.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 2 is a flow diagram of a dynamic control program running in the mobile switching center.

DETAILED DESCRIPTION

For a better understanding of the invention, together with other and further objects, advantages, and capabilities thereof, reference is made to the following disclosure and drawing figures. For clarity of explanation, the illustrative embodiments of the present invention are presented as comprising individual functional blocks. The functions these blocks represent may be provided through the use of either shared or dedicated hardware, including, but not limited to, hardware capable of executing software. Illustrative embodiments may comprise digital signal processor (DSP) hardware, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

Handoff failures and transmission errors are substantially minimized by employing spatial redundancy in a mobile cellular network in accordance with the principles of the invention. Spare stations are redundantly introduced at strategic locations in the cellular network topology. Such selectively employed redundancy is becoming feasible and practicable in a cellular network because of the decreasing cost of hardware and systems. The redundantly deployed spare stations (a) assist in handoffs in either a passive or active mode, (b) handle new calls when a base station is, or likely will become, overloaded, or has failed, and (c) participate in retransmission of data lost due to degraded channel conditions and network congestion. Each spare station can "listen" and quietly monitor activities in adjacent cells. The strategic locations for deployment are based on ground and signal profiles, so that fading signals can be easily restored by the spare stations. When handoff error occurs as a mobile station moves into a new cell, rather than the current base station transfer signaling to a new base station the spare station provides uninterrupted services for the information transfer; and then, later on, when the mobile station is well within the next cell, the spare station can hand over the control to the base station associated with the new cell. The likelihood of a spare station not being able to support smooth transition from the current cell to the next cell is much smaller than with just the conventional handoff procedure. The principles of the invention are applicable to analog, digital and PCS cellular networks for voice and data.

Figure 1A:
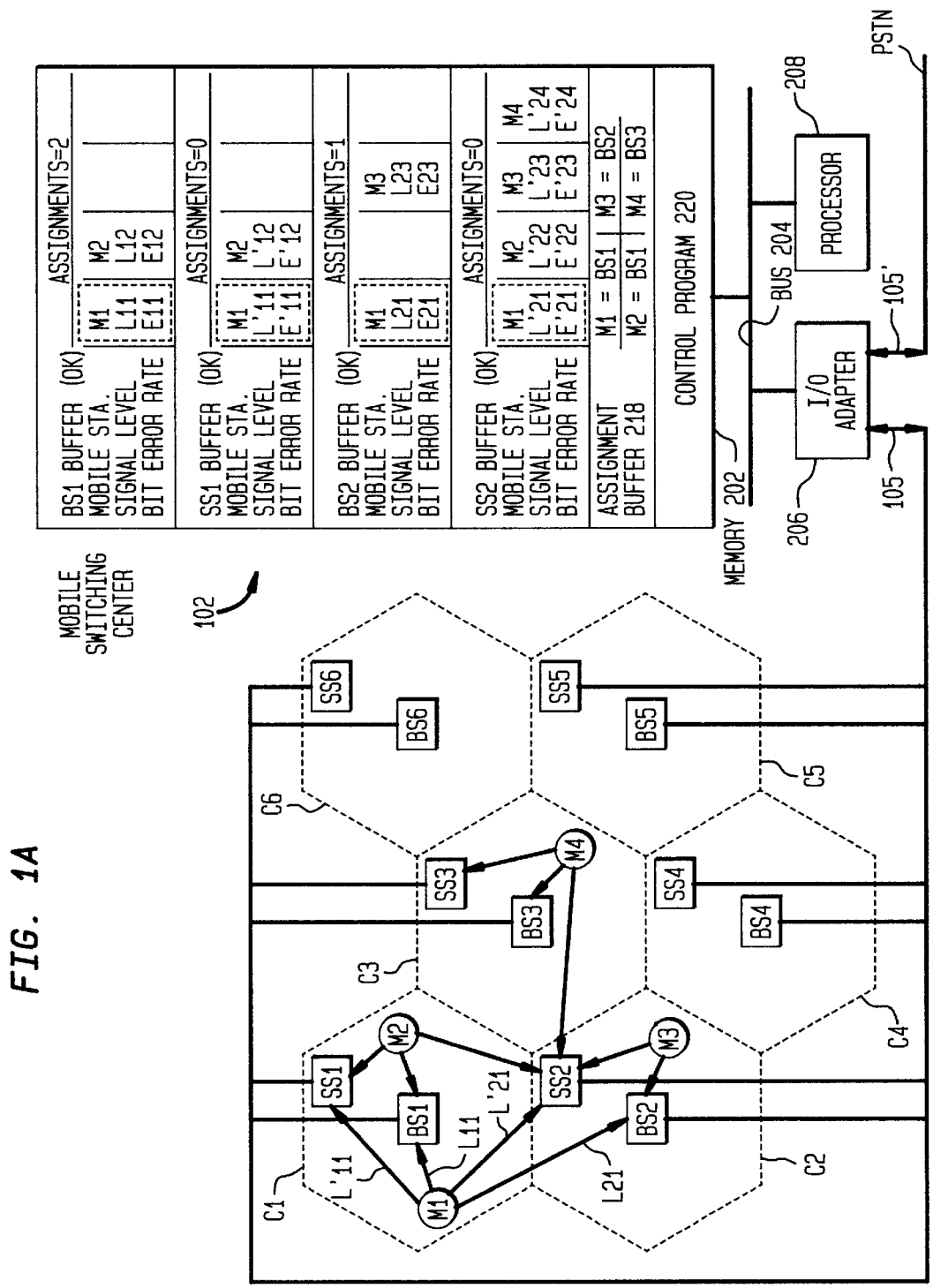
FIG. 1A is a combined network diagram and architectural diagram, showing a cellular network controlled by a mobile switching center, in a first stage when spare stations are monitoring cell activity and are reporting their results to the mobile switching center.

Referring to FIG. 1A, an exemplary mobile cellular network in accordance with a specific embodiment of the invention includes a network of cells and a mobile switching center 102. The network of cells in this exemplary embodiment includes a first cell C1, a second cell C2, a third cell C3, a fourth cell C4, a fifth cell C5, and a sixth cell C6. The first cell C1 includes a first base station BS1 and a first spare station SS1. The second cell C2 includes a second base station BS2 and a second spare station SS2. The third cell C3 includes a third base station BS3 and a third spare station SS3. The fourth cell C4 includes a fourth base station BS4 and a fourth spare station SS4. The fifth cell C5 includes a fifth base station BS5 and a fifth spare station SS5. The sixth cell C6 includes a sixth base station BS6 and a sixth spare station SS6.

The degree of spatial redundancy employed in the cellular network can be adjusted according to the invention. In other exemplary embodiments, more than one spare station (e.g., two) can be deployed per cell (for a higher degree of reliability). This increases costs associated with the cellular network, but enhances performance and reliability. Also, less than one spare station can be deployed per cell; that is, a spare station can be deployed in a region encompassing a plurality of the network of cells. For example, the cellular network can include one spare station located in the middle of a hexagonal configuration of seven cells. This lower degree of redundancy offers cost savings, but provides less reliability.

For a higher degree of redundancy, e.g., more than one spare station deployed per cell, each deployed spare station is able to transmit and receive using less power. If, however, there is one spare station deployed for several cells (e.g., so that the spare station is deployed in the middle of the hexagonal configuration), each spare station should have higher transmitting power and a more sensitive receiver in order to "overlook" the larger coverage area.

The mobile switching center 102 includes an input/output (I/O) adapter 206, a processor 208, a memory 202, and a bus 204. The input/output (I/O) adapter 206 is in communication with the public switched telephone network (PSTN) and with the base station and the spare station of each of the network of cells through a landline in the form of a backbone. The processor 208 is coupled to the I/O adapter 206 and to the memory 202 through the bus 204. The memory 202 is in communication with the I/O adapter 206 through the bus 204. The memory 202 stores a dynamic control program 220, which runs in the mobile switching center 102. The memory component 202 of the mobile switching center 102 includes an assignment buffer 218, and for each of the cells in the network of cells that are being monitored by the mobile switching center 102, base station and spare station handoff buffers. By way of example, and not limitation, FIGS. 1A–1E schematically depict within the memory 202 a BS1 handoff buffer section, an SS1 handoff buffer section, a BS2 handoff buffer section, and an SS2 handoff buffer section for purposes of describing this illustrative embodiment of the invention. The assignment buffer 218 indicates the current assignment of particular mobile stations to particular base or spare stations. Each handoff buffer section (for BS1, SS1, BS2 and SS2) shown in FIGS. 1A–1E indicates a current record of how many mobile stations are assigned to the particular base or spare station. Each of the handoff buffer sections depicted in FIGS. 1A–E stores and updates data according to the dynamic control program 220 running in the mobile switching center 102 according to the invention. Each of the buffers in the memory 202 is used for monitoring and storing data about one or more mobile stations. Each of the buffers presents a label (e.g., M1, M2, . . . etc.) for the one or more mobile stations with which it communicates and stores a signal level and a bit error rate, which are also labeled, for each of the one or more mobile stations.

FIG. 1A is a combined network diagram and architectural diagram, showing the cellular network controlled by the mobile switching center 102, in a first stage when the spare stations are monitoring cell activity and are reporting their results to the mobile switching center 102. According to the example depicted by FIG. 1A, four mobile stations are moving through the network of six cells. The four mobile stations include a first mobile station M1, a second mobile station M2, a third mobile station M3, and a fourth mobile station M4. Mobile station M1 and mobile station M2 are shown in the first cell C1. The third mobile station M3 is shown in the second cell C2. The fourth mobile station M4 is shown in the third cell C3. Mobile station M1 is shown in communication with the first base station BS1, the first spare station SS1, the second spare station SS2, and the second base station BS2. Mobile station M2 is shown in communication with the first base station BS1, the first spare station SS1, and the second spare station SS2. Mobile station M3 is shown in communication with the second base station BS2 and the second spare station SS2. Mobile station M4 is shown in communication with the third base station BS3, the third spare station SS3, and the second spare station SS2.

The assignment buffer 218 depicted in FIG. 1A shows that mobile station M1 is assigned to base station BS1. Mobile station M2 is assigned to base station BS1 as shown by the assignment buffer 218. Mobile station M3 is assigned to base station BS2. Mobile station M4 is assigned to base station BS3. Buffer section BS1 shows in FIG. 1A that base station BS1 is "OK"0 (i.e., that it has not failed or become overloaded). Buffer section BS1 also shows that two mobile stations are currently assigned to base station BS1. Buffer section SS1 shows in FIG. 1A that spare station SS1 is OK (it has not failed or become overloaded) and that zero mobile stations are currently assigned to spare station SS1. Buffer section BS2 shows in FIG. 1A that base station BS2 is OK and that one mobile station is currently assigned to base station BS2. Buffer section SS2 shows that spare station SS2 is presently OK and that zero mobile stations are currently assigned to spare station SS2.

The processor 208 within the mobile switching center 102 runs the dynamic control program 220 stored in the memory 202. The processor 208 controls data going into and out of the mobile switching center 102 through the I/O adapter 206 on communication line 105 and communication line 105'. FIG. 2 is a flow diagram of the dynamic control program 220 running in the mobile switching center 102. Referring to FIG. 2, the dynamic control program 220 includes a set of instructions which, when executed by the processor 208, cause the mobile switching center 102 to continuously perform the following sequence of steps and repeat those steps during operation according to the dynamic control program 220. Spare stations are monitoring adjacent cells throughout the cellular network and are sending reports to the mobile switching center 102 through the communication line 105 coupled to the I/O adapter 206. The mobile switching center 102 receives spare station reports in step 402. The mobile switching center 102 receives base station reports of normal mobile handoffs in step 404. The position and velocity of mobile stations are computed based on signal levels and bit error rates in step 406. The probabilities of cell boundary crossings are computed in step 408. The control program 220 projects future call traffic patterns in step 410.

The control program 220 performs dynamic load balancing for a fluctuating traffic load and efficient spectrum utilization in step 412. If a base station is failing, calls are assigned to the spare station associated with that base station in step 414. If a base station handoff buffer is too full, calls are assigned to the spare station associated with that base station in step 416. The spare stations continue to monitor adjacent cells of the cellular network in step 418 and report their results to the mobile switching center 102, whereupon the sequence of steps is repeated according to control program 220.

Figure 1B:
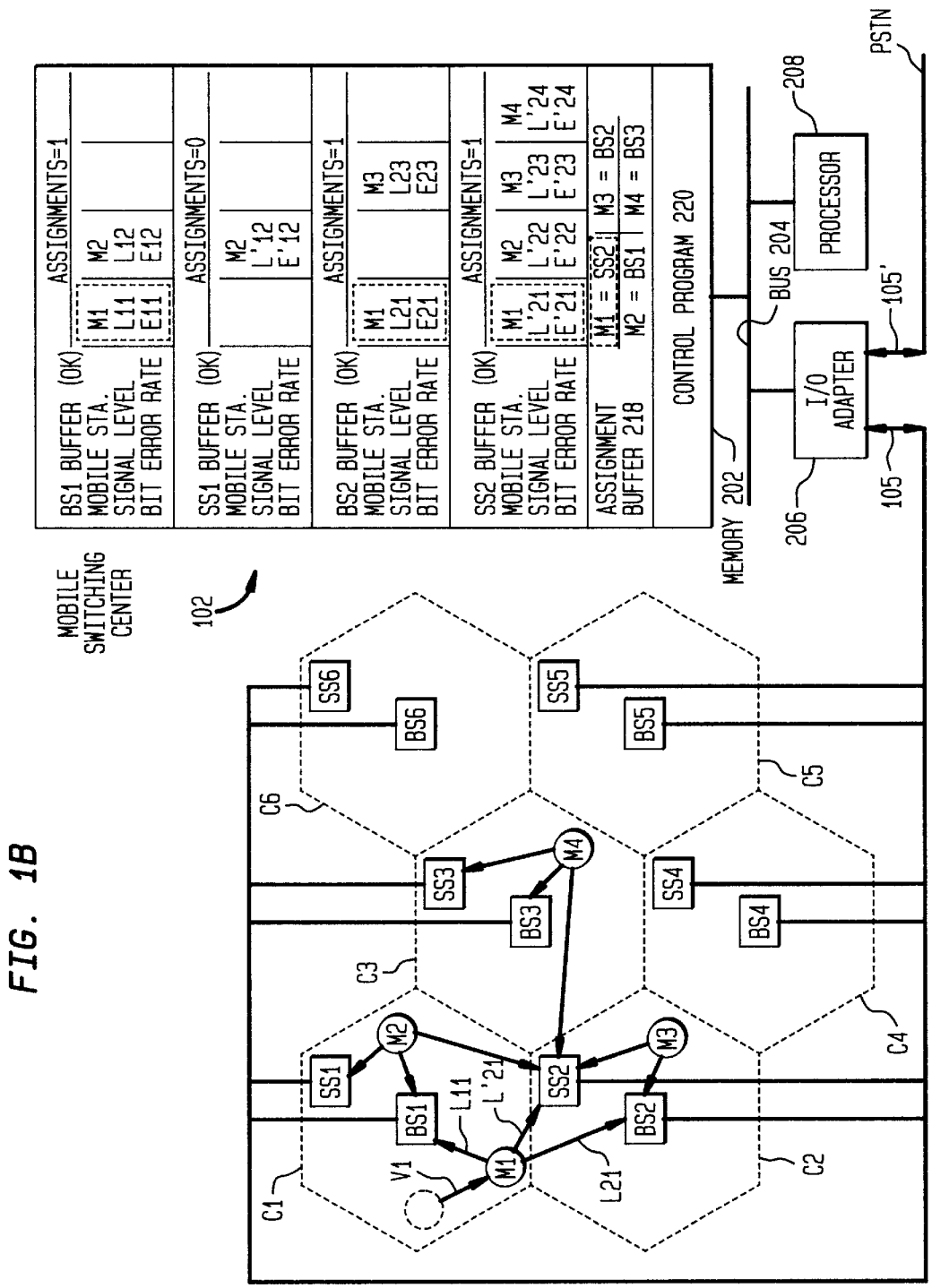
FIG. 1B shows a next stage following that shown in FIG. 1A, when the mobile switching center computes the position and velocity of a mobile station assigned to a first base station in a first cell based on the reports from the spare stations.
Figure 1C:
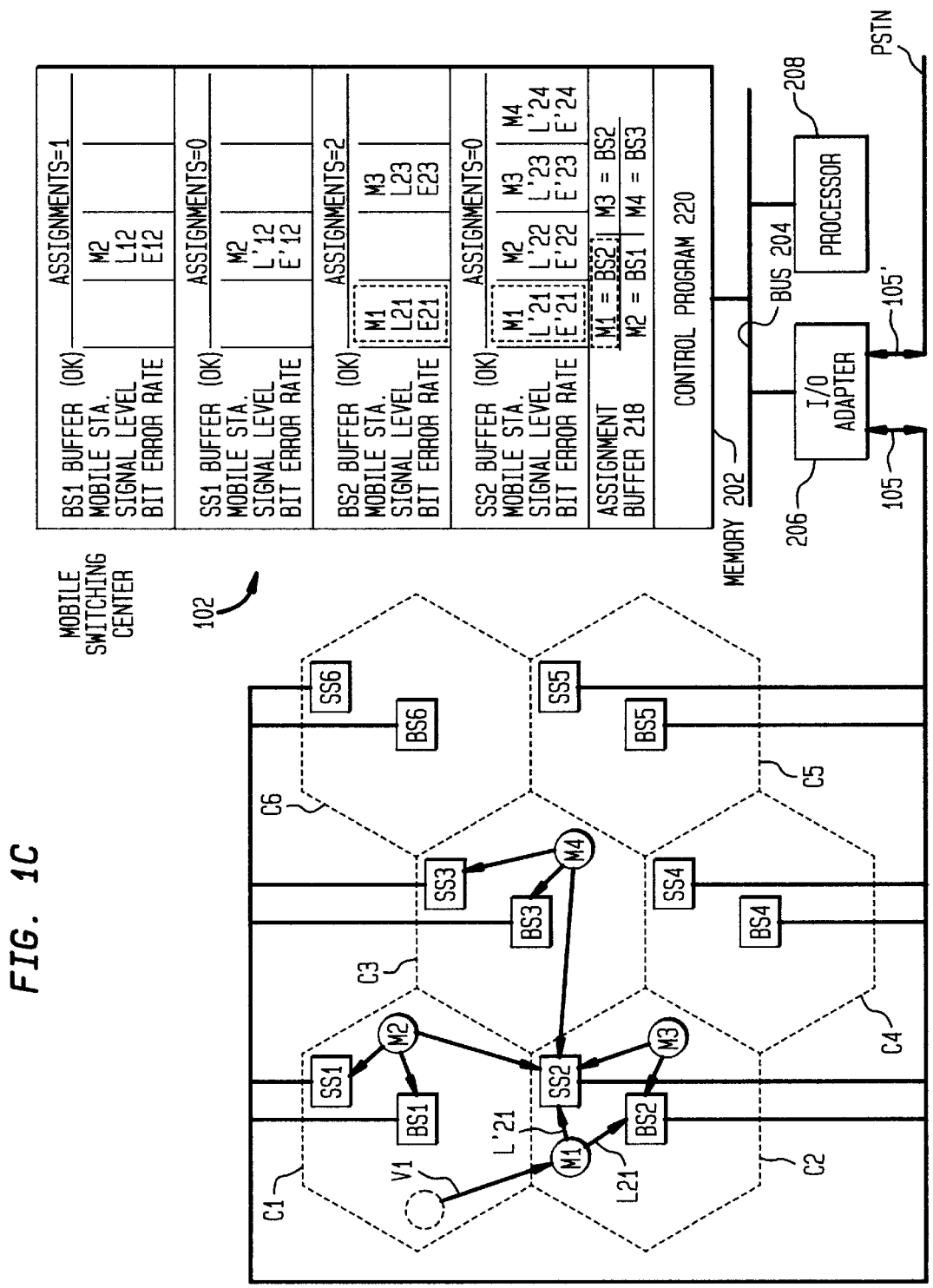
FIG. 1C shows a next stage following that shown in FIG. 1B, when the mobile switching center hands off the mobile station to a second base station in a second cell.

FIGS. 1A–1C illustrate the benefit of the redundancy provided by the spare stations which can handle a handoff as the first mobile station M1 traverses the boundary between the first cell C1 and the second cell C2 as depicted in the exemplary network of cells. Referring to FIG. 1A, mobile station M1 is in communication with base station BS1, spare station SS1, base station BS2, and spare station SS2.

The buffer section for base station BS1 shows that base station BS1 is in communication with mobile station M1 and mobile station M2. The buffer section for spare station SS1 shows that spare station SS1 is in communication with mobile station M1 and mobile station M2. The buffer section for base station BS2 shows that base station BS2 is in communication with mobile station M1 and mobile station M3. The buffer section for spare station SS2 shows that the spare station SS2 is in communication with mobile station M1, mobile station M2, mobile station M3, and mobile station M4. Assignment buffer 218 shows that mobile station M1 is assigned to base station BS1.

FIG. 1B shows a next stage of operation according to this specific embodiment of the invention following that shown in FIG. 1A, when the mobile switching center 102 computes the position and velocity of the mobile station M1 based on the reports from the spare stations located throughout the cellular network in accordance with the principles of the invention. Spare station SS2 can either (i) warn base station BS2 that mobile station M1 will soon be entering the second cell C2, or (ii) temporarily take the handoff of mobile station M1. Referring to FIG. 1B, in an example of the latter role, mobile station M1 approaches the boundary region of the first cell C1 and the second cell C2. Mobile station M1 thus moves farther from base station BS1 at a velocity V1 in the first cell C1. The mobile switching center 102, determines the position and velocity of the mobile station M1 based on the reports from the spare stations. Based on these reports mobile station M1 is assigned to spare station SS2. Transfers of assignments of mobile stations to base stations and/or spare stations according to the invention are based on signal level and bit error rate. Spare station SS2 will assume primary communication with mobile station M1 during the handoff. FIG. 1B shows that assignment buffer 218 switched the assignment of calls associated with mobile station M1 from base station BS1 (as depicted in FIG. 1A) to spare station SS2. FIG. 1B shows that the buffer section for spare station SS2 indicates that spare station SS2 has been assigned an additional mobile station, while the buffer section for base station BS1 indicates that the number of assignments of mobile stations to base station BS1 has been reduced by one mobile station.

Alternatively, instead of temporarily taking the handoff of mobile station M1 as it enters the second cell C2, spare station SS2 could issue a warning to base station BS2 that mobile station M1 will soon be entering cell C2.

FIG. 1C shows a next stage of operation following that shown in FIG. 1B, when the mobile switching center 102 hands off the mobile station M1 from the spare station SS2 to the base station BS2 in the cell C2. Referring to FIG. 1C, mobile station M1 has moved well inside cell C2. Mobile station M1 is in communication with base station BS2 and spare station SS2. FIG. 1C shows the buffer section for base station BS2 which indicates that base station BS2 is in communication with mobile station M1 and mobile station M3; and also shows the buffer section for spare station SS2 which indicates that spare station SS2 is in communication with mobile station M1, mobile station M2, mobile station M3, and mobile station M4. FIG. 1C shows that the buffer section for base station BS2 stores the signal level and bit error rate for communications with mobile station M1; and also that the buffer section for spare station SS2 stores the signal level and bit error rate for communications with mobile station M1. Based on the respective signal levels and bit error rates, the mobile switching center 102 assigns mobile station M1 from spare station SS2 to base station BS2. The assignment buffer 218 shown in FIG. 1C indicates that mobile station M1 is now currently assigned to base station BS2.

Figure 1D:
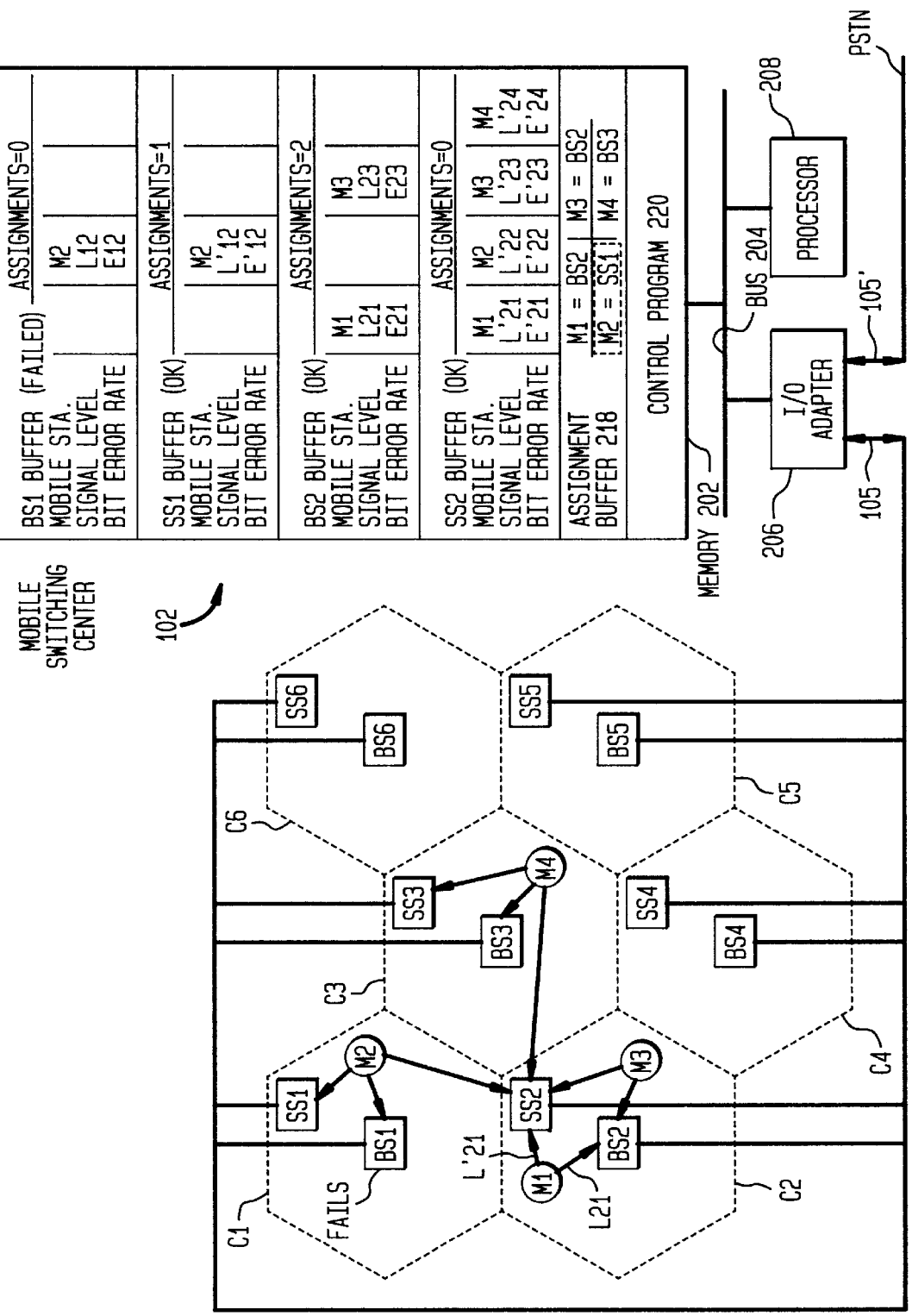
FIG. 1D shows a next stage following that shown in FIG. 1C, when the first base station fails while handling another mobile station and the mobile switching center assigns the mobile station to a first spare station.

FIG. 1D shows a next stage of operation following that shown in FIG. 1C, in which the base station BS1 fails while handling mobile station M2 and the mobile switching center 102 assigns the mobile station M2 to the spare station SS1. Referring to FIG. 1D, the spare stations are positioned according to the invention to take over primary communication with a mobile station which is assigned to a base station when the base station fails. The mobile station M2 is in communication with the base station BS1, the spare station SS1, and the spare station SS2, as shown in FIG. 1D.

In the example shown in FIG. 1D, the buffer section for base station BS1 indicates that base station BS1 fails. The buffer section for spare station SS1 shows that spare station SS1 is in communication with the mobile station M2. The buffer section for spare station SS2 indicates that spare station SS2 is in communication with mobile station M2. Upon the failure of base station BS1, as shown in FIG. 1D, and based on the relative signal strengths and bit error rates for communication of spare station SS1 and spare station SS2 with mobile station M2, the mobile switching center 102 assigns mobile station M2 to spare station SS1. The assignment buffer 218 depicted in FIG. 1D shows that the mobile switching center 102 has assigned mobile station M2 to spare station SS1 because of the failure of base station BS1. The buffer section for spare station SS1 shows an increase from zero to one in the number of current assignments in response to mobile station M2 now being assigned to spare station SS1. Whereas the buffer section for base station BS1 shows a decrease in the number of current assignments for base station BS1 by one mobile station from one to zero. FIG. 1D illustrates that the positioning of spare stations throughout the network of cells helps to ensure constant communication with mobile stations, and in this particular example that the first spare station SS1 picks up the slack when the first base station BS1 fails so that mobile station M2 can still communicate through the cellular network to the PSTN.

FIGS. 1A through 1C thus show the advantage of the redundancy provided by the spare stations for ensuring a smooth handoff during normal operating conditions. FIG. 1D shows the advantage of the redundancy provided by the spare stations during the case when a base station fails.

Figure 1E:
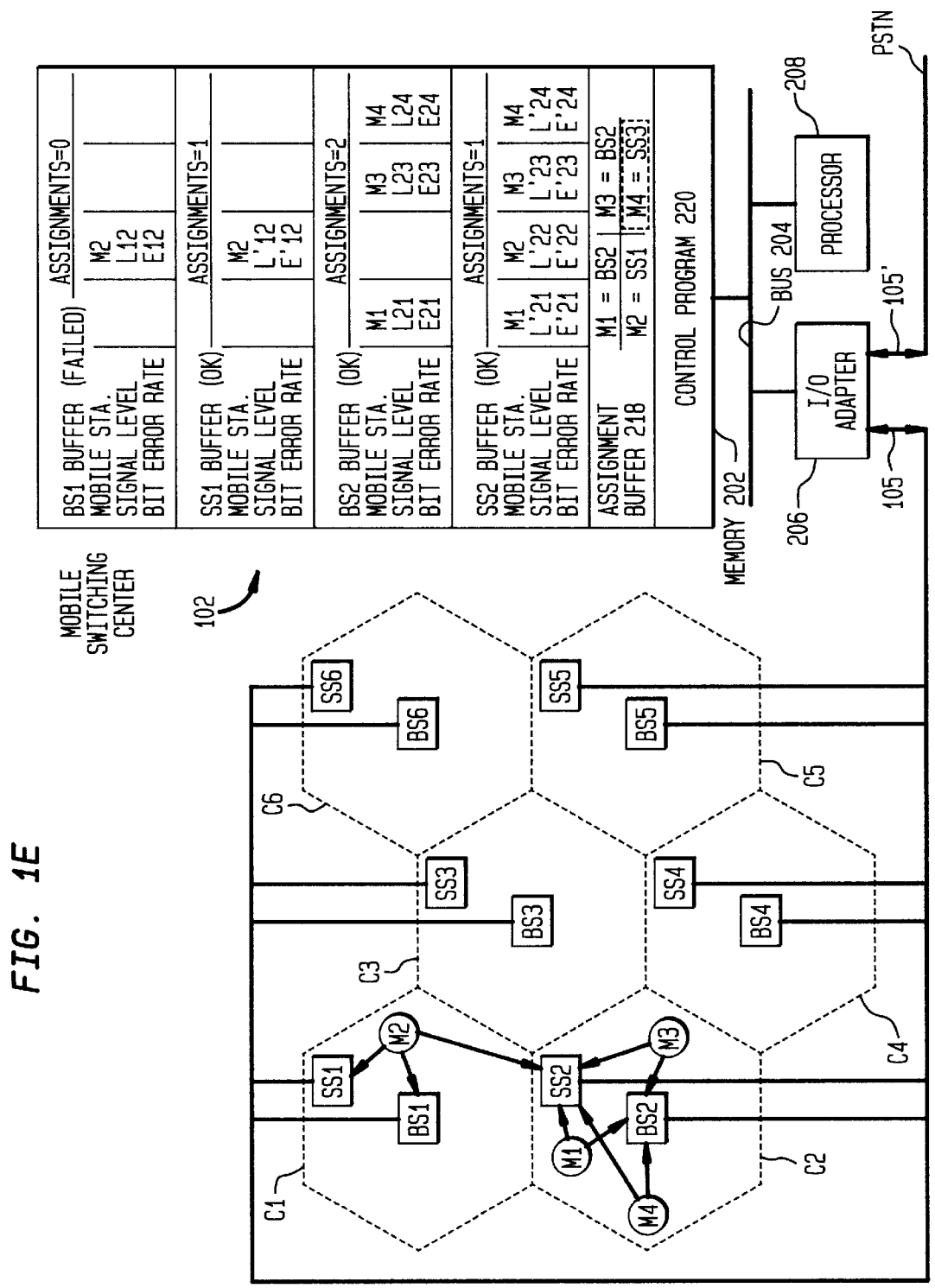
FIG. 1E shows a next stage following that shown in FIG. 1D, when yet another mobile station moves into the second cell and overloads the handoff buffer for the second base station, and the mobile switching center assigns the mobile station to a second spare station.

FIG. 1E shows a next stage following that shown in FIG. 1D, when the fourth mobile station M4 moves into cell C2 and overloads the handoff buffer for base station BS2. In this example, the mobile switching center 102 assigns mobile station M4 from the base station BS3 to the spare station SS2, which is located along with base station BS2 within cell C2 of the cellular network. According to the example shown in FIG. 1E, the mobile station M4 has moved from the third cell C3 (where it was depicted in FIG. 1D) to the second cell C2. Referring to FIG. 1E, the base station BS2 in the second cell C2 is in communication with the mobile station M1, the mobile station M3, and the mobile station M4. The spare station SS2 in the second cell C2 is in communication with the mobile station M1, the mobile station M2, the mobile station M3, and the mobile station M4. Rather than having all of mobile station M1, mobile station M3, and mobile station M4 assigned to base station BS2 as would be the case if mobile station M4 were handed off from base station BS3 to base station BS2 according to conventional practice, the mobile switching center 102 determines that spare station SS2 in cell C2 can help and makes an assignment of mobile station M4 from base station BS3 to spare station SS2 according to the principles of the invention.

The assignment buffer 218 shown in FIG. 1E shows that mobile station M1 is now assigned to base station BS2, that mobile station M2 is now assigned to spare station SS1, that mobile station M3 is now assigned to base station BS2, and that mobile station M4 is now assigned to spare station SS2 which prevents the overloading of base station BS2. Referring to FIG. 1E, the buffer section for spare station SS2 shows an increase because of this handoff in the number of assignments of mobile stations to spare station SS2 from zero mobile stations (as shown in FIG. 1D when mobile station M4 was located within cell C3) to one mobile station (i.e., mobile station M4 now located in cell C2). FIG. 1E thus shows that when a base station becomes overloaded, or likely will become overloaded, with excessive communication with mobile stations a redundantly deployed spare station can assume control of communication with one or more mobile stations to prevent overloading of the base station and failure of communication. The mobile switching center 102 performs a continuing monitoring process to detect impending handoffs, failures of base stations, and overloading of base stations in order to manage the cellular network in accordance with the principles of the invention.

From the foregoing it will be appreciated that the spare stations introduced strategically throughout the cellular network are able to retransmit data packets lost due to network congestion or high error rates, handle new calls when a base station is overloaded, and assist in handoffs; and also that the principles of the invention are applicable to analog, digital, and PCS cellular networks.

While several particular forms of the invention have been illustrated and described, it will also be apparent that various modifications can be made without departing from the spirit and scope of the invention.

What is claimed is:

1. A method of routing a call for use in a cellular network including a network of cells, the method comprising the steps of:

receiving a report from a spare station deployed in one of the network of cells;

determining from said report the position and velocity of a mobile station moving through the network of cells;

changing the assignment of a call associated with the mobile station from a first base station to the spare station as a result of said determining step; and changing the assignment of the call from the spare station to a second base station deployed in the same cell as the spare station.

2. A method as defined in claim 1, further comprising the step of:

determining the assignment of the call based on a signal level and a bit error rate.

3. A method as defined in claim 1, further comprising the step of:

deploying at least one spare station in each of the network of cells.

4. A method as defined in claim 1, further comprising the step of:

deploying a spare station in a region defined by a plurality of the network of cells.

5. A method as defined in claim 1, further comprising the step of:

issuing a warning that the mobile station will cross a boundary between cells of the network.

6. A method as defined in claim 1, wherein:

the call is assigned temporarily to the spare station before being assigned to the second base station.

7. An apparatus, comprising:

means for receiving a report from a spare station deployed in one of the network of cells;

means for determining from said report the position and velocity of a mobile station moving through the network of cells;

means for changing the assignment of a call associated with the mobile station from a first base station to the spare station as a result of said determinists; and means for changing the assignment of a call from the spare station to a second base station deployed in the same cell as the spare station.

* * * * *